Figure 1:
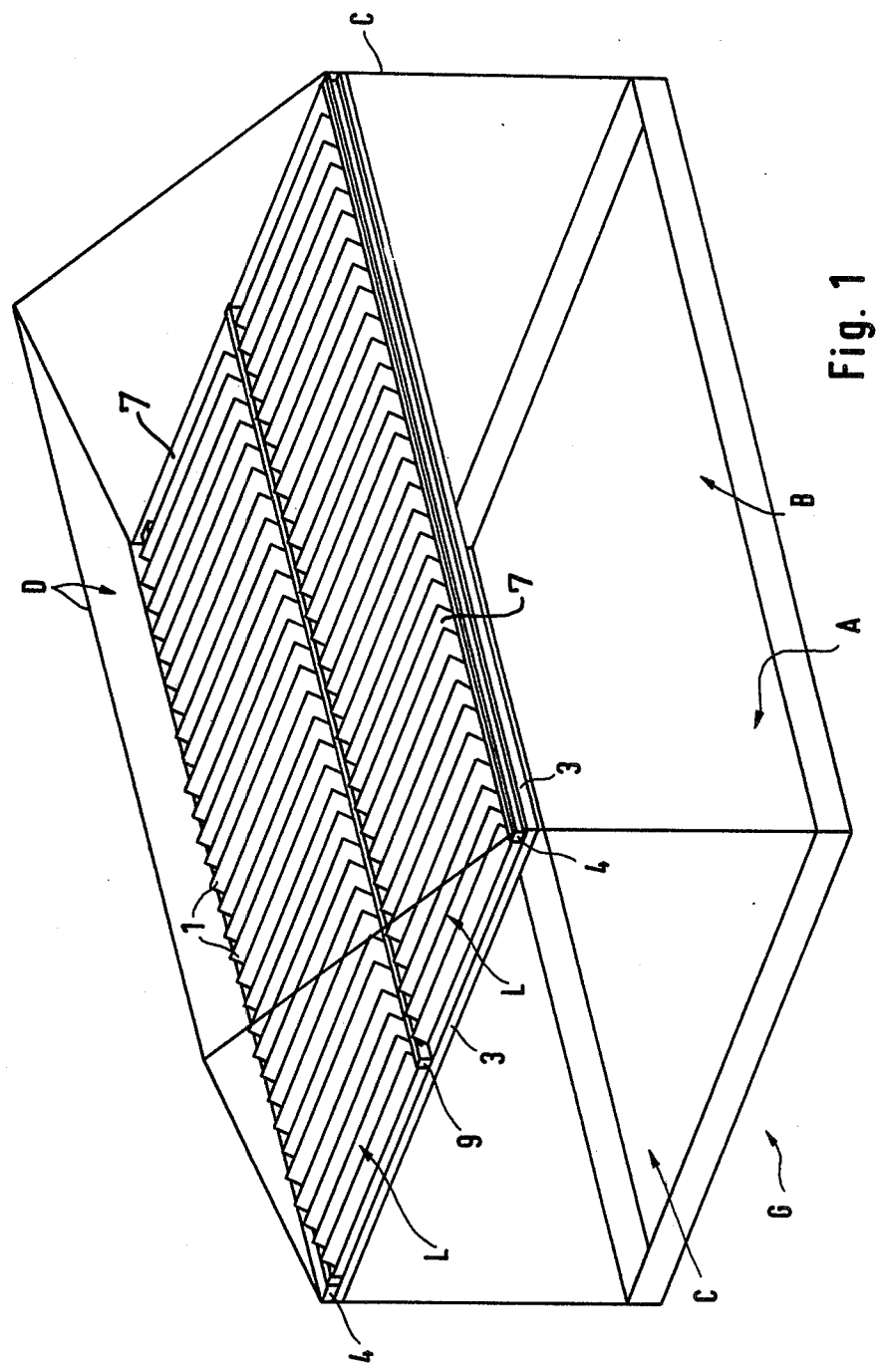

United States Patent [19]

Badertscher et al.

[11] 4,128,307

[45] Dec. 5, 1978

[54] DEVICE FOR CONTROLLING THE INCIDENCE OF HEAT AND LIGHT RADIATION, PARTICULARLY FOR GREENHOUSES AND THE LIKE

[75] Inventors: Hans Badertscher; Walter Schindler, both of Basel, Switzerland

[73] Assignee: Plascon AG., Munchenstein, Switzerland

[21] Appl. No.: 808,421

[22] Filed: Jun. 20, 1977

[30] Foreign Application Priority Data

Jun. 22, 1976 [CH] Switzerland .................. 7989/76

[51] Int. Cl.² ........................................... G02B 27/00
[52] U.S. Cl. ....................................... 350/263; 47/17; 49/74; 52/64; 160/167; 160/176 R; 160/328

[58] Field of Search ............... 350/263; 160/1, 166 R, 160/167, 176, 181, 188, 328, 329, DIG. 17; 49/74; 47/17; 52/64

[56] References Cited

U.S. PATENT DOCUMENTS

| 2,046,601 | 7/1936 | Atkinson | 350/263 X |
| 2,857,634 | 10/1958 | Garbade et al. | 350/263 X |

Primary Examiner—Richard A. Wintercorn
Attorney, Agent, or Firm—Ladas, Parry, Von Gehr, Goldsmith & Deschamps

[57] ABSTRACT

A device for controlling the incidence of heat and light radiation on a growing area of a greenhouse or the like comprises slats of a non-self-supporting material which are tensioned to hold them in shape. The slats are arranged in parallel side-by-side relationship to cover substantially the whole growing area and can be tilted like Venetian blinds.

8 Claims, 5 Drawing Figures

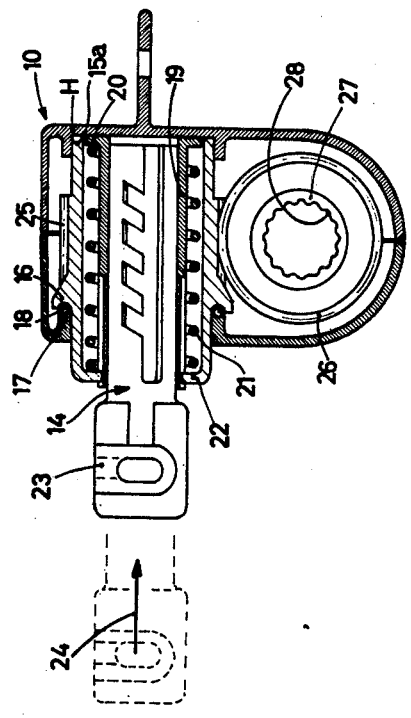
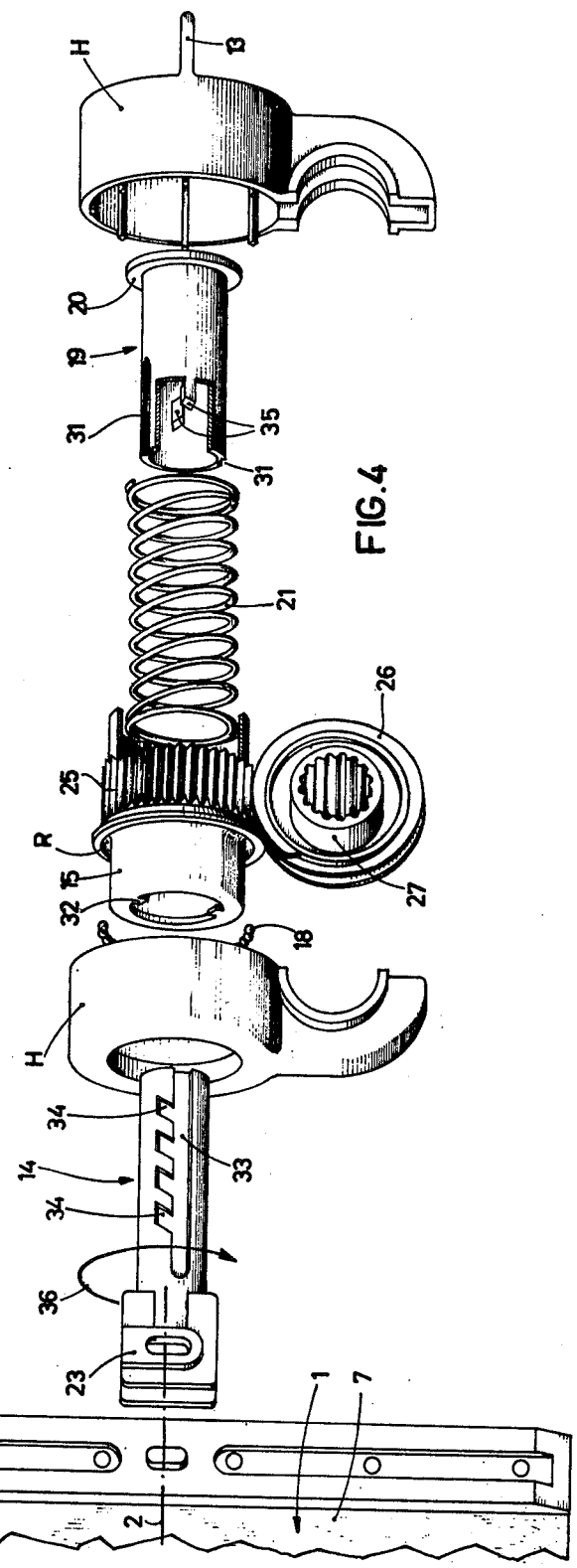

DEVICE FOR CONTROLLING THE INCIDENCE OF HEAT AND LIGHT RADIATION, PARTICULARLY FOR GREENHOUSES AND THE LIKE

The invention relates to a device for regulating the incidence of heat and light radiation, particularly for greenhouses and similar, with a plurality of swivelling slats, which can be tilted like a Venetian blind and to an adjusting mechanism for operating them.

A known device fulfills the function of covering and shading cold frames and for each window of the cold frame there is provided a framework with a number of tiltably arranged slat elements, whose position relative to each other is adjustable and which are displaceable within the framework. In order to cover the windows of cold frames, the frameworks with their slat elements are laid from outside over the cold frame window surfaces and are supported in corresponding tilting bearings so that they can be lifted up or placed down as the need arises. Such a known device is obviously of use for covering and shading relatively small areas of cultivation. Should one wish to use them for greenhouses, then large and heavy constructional parts would be needed, which because of their great weight would lead to an intollerable loading on the roof of a greenhouse.

For shading greenhouses, coating of certain light-permeable surfaces of greenhouses with a light-protecting coloring are known, as are the application to surfaces which are to be screened of so called shading fabrics, or the hanging of such fabrics over desired surface regions inside the greenhouse roof.

It is a disadvantage with these various known measures for shading the growing surfaces in greenhouses that the shading elements which are used are very inflexible in their application, and are further not suitable for allowing an optimal adaption to frequent and often quickly changing radiation conditions, and are further not suitable, or are only suitable when costly means are used, for a desirable automation. A planned shading with the possibility of simultaneously protecting the inside of the greenhouse from undesired heating up is impossible with known units.

In the field of devices which protect buildings from the sun, slat arrangements for large area covering are known, which can be applied to a facade or the roof region of the building, which for reasons of resistance to weathering must be provided with heavy self-supporting slats, which must also be tilted by correspondingly robustly constructed adjusting mechanisms. Such known arrangements are obviously far too heavy and overally too costly for greenhouse constructions.

It is hence the object of the invention to provide a device which avoids the disadvantages of what is known and which is provided with slat elements which has a low weight even when used with greenhouses with a large area of cultivation and which has the smallest possible resistance against its adjustment, and which is further provided with an adjusting device for the slats, which in their turn provide the best possible radiation conditions for the products which are being cultivated in the greenhouse. Furthermore, the device should on the one hand provide in the extreme case a total reflection of light rays, and on the other, if necessary, keep the heat radiation portion of the light away from the inside of the greenhouse.

According to the invention this purpose is resolved in a device as defined above by making the slat elements in the form of stressed foil-like slats which extend within the greenhouse approximately over the whole surface under cultivation.

The consruction according to the invention of the slat elements as foil-like slats which are hence not self-supporting and are held under tension and their accommodation in the characterized manner inside the greenhouse provides a construction which is protected from direct weathering influences and which is extremely light which creates very favourable conditions for effective automatic control of the desired position of the slats. The arrangement according to the invention is furthermore comparatively inexpensive to produce, which provides an important precondition for its economic application in greenhouses, particularly those with large areas of cultivation.

The arrangement according to the invention can furthermore be combined with an operating device which carries out adjustment of the slats depending on both the angle of incidence of the radiation and at the same time on the intensity of radiation in the area under cultivation. Advantageously this is produced by providing for, within definite limits of the intensity of radiation inside the greenhouse, an exact regulation of the slat elements, via the operating device, corresponding to the particular angle of incidence of the radiation, so that, especially because of the insignificantly small reduction in the path of the radiation through the plane of the foil-like thin slats, an unrestricted incidence of heat and light radiation is possible. As soon as an upper limiting value for the intensity of radiation has been exceeded, the operating device produces a rotation of the slat elements to corresponding angular positions relative to the direction of incidence of the radiation, by which means the directly incident radiation is attenuated to an extent that the intensity of the radiation which penetrates into the greenhouse remains at the desired value. The arrangement according to the invention particularly makes it possible to control automatically the incidence of light and heat radiation in such a way that the best possible incidence of light (extreme case: negligible shadowing caused by the slat elements) and the best possible shadowing (extreme case: total reflection of the radiation) are produced as a function of the prevailing weather conditions. Thanks to continuous control of the position of the slats, the prevailing temperatures in a greenhouse can be kept very low when compared with conventional greenhouses, because of the position (angular inclination) and the reflecting effect of the slats. This leads to a drastic reduction in the need for watering, and furthermore the ventilation problems which always occur with conventional greenhouses become insignificant.

Since in the arrangement according to the invention the slat elements inside the greenhouse can stretch approximately over the whole area under cultivation, the green-house is practically provided with an intermediate ceiling provided by the slat elements. In the closed position the greenhouse is practically divided into a usable area with the plants under cultivation below the above plane and a roof region above this plane. When, because of an incidence of light which is below a particular lower limit, the slats are maintained in a closed position, for example during the night, the useful space only occupies a part of the total volume of the greenhouse, which makes it possible to carry out any necessary heating of the inner space in an energy-saving manner, since the closed slats provide a certain amount of thermal insulation.

According to a preferable embodiment the slat elements inside the greenhouse can form several adjacent rows of slat elements which are horizontal to each other or inclined with respect to each other, which can be adjusted by the operating device independently of each other or in the same way as all the other slat elements.

Further characteristics of the invention are the object of the subordinate claims.

Figure 3:
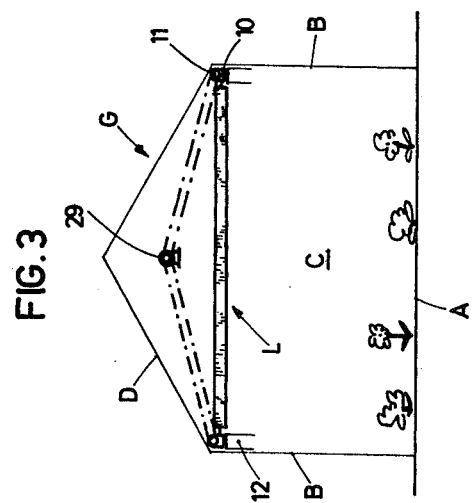
Figure 2:
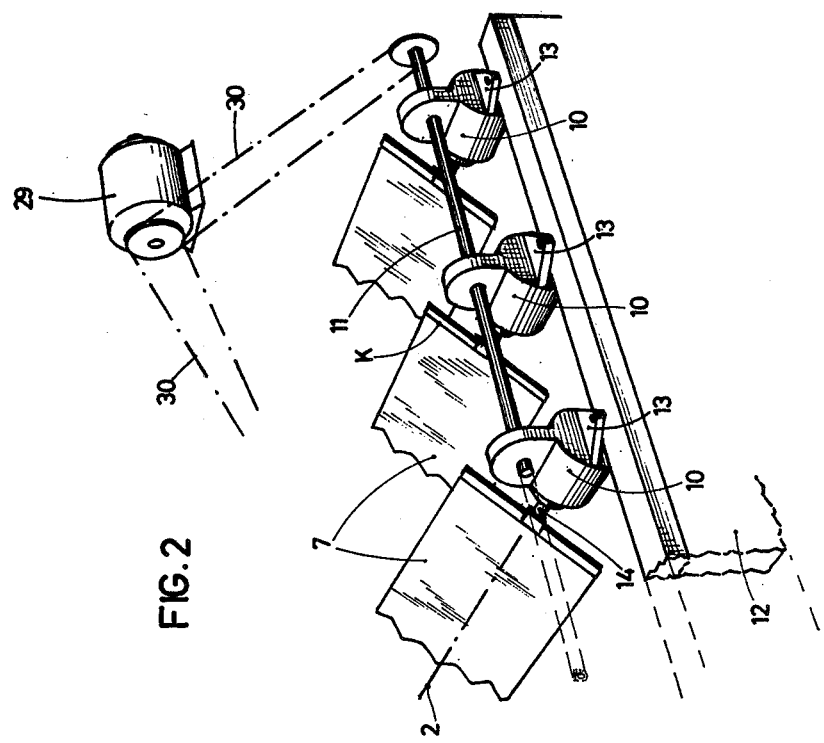

An embodiment of the invention will now be described in more detail with respect to the drawings. There are shown in:

FIG. 1 a perspective view of a schematically represented greenhouse,

FIG. 2 a perspective view of a section of an edge region of a row of slats according to a preferred embodiment, FIG. 3 a simplified vertical section through a greenhouse, FIG. 4 a perspective view of a tilting device element, whose individual parts for clarity's sake are shown in a dismantled state on the main axis of a slat element, and FIG. 5 a vertical section through a tilting drive element according to the embodiment shown in FIG. 2 in its assembled state.

A greenhouse shown in FIG. 1 as G has a conventional construction with a floor or cultivating region A, longitudinal side walls B, end walls C and roof sufaces D. Round about the top of the upright walls, a device for controlling the incidence of heat and light radiation in the inside of the greenhouse is provided, consisting of a plurality of slat elements 1, which lie in a plane which passes horizontally over the surface of cultivation A, and which comprises two rows L which are side-by-side and which extend in the longitudinal direction of the greenhouse G. The rows L of slat elements form a type of intermediate ceiling in the greenhouse G. The slat elements 1 each have a tilting axis 2, which preferably coincide with the central longitudinal plane of the slats 7 of an element, and can be tilted about this axis of tilting 2 in the manner of a Venetian blind via the adjusting device.

The rows of slat elements L are supported by a supporting frame 3 which is arranged at about the height of the tops of the upright walls. In the embodiment shown with two rows of slat elements, at the longitudinal outer edge, edge rails 4 are provided which are each perpendicular to the tilting axes of the slat elements 1, in which the slat elements 1 are tiltably mounted using tilting guides. Moreover, i.e., in the case of wide greenhouses, if desired, a middle rail 9 way be provided in addition to the side rails 4 at the outer edge of the greenhouse, which is carried on the supporting frame 3, on which the tilting guides for the corresponding slat elements on both sides are provided.

The slats which have been chosen for the example consist of thin reflecting and to a certain extent elastic aluminium foil, which are not self-supporting along their length, which are clamped at their end edge sections, as will be described below.

The slats of one row of slats L or the various slats of several adjacent rows should preferably be able to be adjusted synchronously and uniformly with respect to each other, this being obtained by connecting the tilting guides of the slat elements 1 together by means of transmission means. These transmission elements should be made as elements which are as free of slipping as is possible, as is the case with rack and pinion gearing, toothed belts, chain drives and similar. FIGS. 2 to 5 of the drawings show an example of an embodiment.

The greenhouse which is shown in simplified form and in section in FIG. 3 again has an area of cultivation A, longitudinal side walls B, end walls C and roof surfaces D. In this embodiment a row of slats L is arranged in a horizontal plane. A row of transmission elements 10 on the two longitudinal ends of the slat elements, which have the double function of transmitting the rotational movement of a through drive shaft 11 which connects a row of transmission elements 10 to the slats, and of keeping the slats 7 in a constant state of tension. The way this is resolved is shown in FIGS. 2, 4 and 5.

According to FIG. 2, a row of transmission elements 10 are fastened on a vertical supporting frame 12 of the greenhouse by means of their fixing flanges 13. Each transmission element 10 holds a clamping means or piece K carried by a tiltable pin 14, which clamping piece contacts the end section of the respective foil-like slat 7 so as to clamp it tightly. A swinging holder which allows a limited swinging of the clamping piece on the holding pin 14 has shown itself to be advantageous. Opposing transmission elements 10 act as tilting means wherein the respective clamping means K maintain each slat in a substantially planar configuration while under the action of tension means and during the synchronous rotation of the drive shafts for the tilting means as described below.

The principal item of this embodiment is formed by the transmission element 10, whose construction is shown in FIGS. 4 and 5.

The transmission element 10 has a housing H, which can advantageously consist of two halves which can be joined at their middle plane. In the upper part of the housing there is a cylindrical bushing 15, which on the one hand is supported with one end 15a against the housing wall and on the other is held by means of a radial shoulder 16 and an annular shoulder 17 which is turned inwards. Between the annular shoulder 17 and the radial shoulder 16, a ball bearing 18 is preferably arranged.

The tiltable pin 14 is coupled to a cylindrical bushing 19, so that these two parts are detachably coupled together in the axial direction. The bushing 19 has an annular flange 20 at its inner end, which acts as a support for a helical spring 21, whose other end is supported against the turned in annular flange of the bushing 15. The tiltable pin 14 which is provided with a connecting piece 23 is in this way held under a pre-stessing force by the helical spring 21 via the bushing 19, which causes the tiltable pin 14 which is shown in its operating position by dashed lines to be pushed in the direction of the arrow 24 (FIG. 5), by which means the slat 7 is held in a stretched condition while allowing for the thermal expansion which occurs. The helical spring 21 acting on bushing 19 serves as a tension means associated with the opposed tilting means or transmission elements 10 to maintain the slat 7 under tension.

A worm wheel of a worm gearing 25 is arranged on the periphery of the cylindrical bushing 15, of which the associated worm 26 is rotatably mounted in the lower part of the housing H. The hub of the worm 27 has an inside shaping 28 which corresponds to the shape of the periphery of the shaft 11 (FIG. 2). The splined shafts which are arranged on each side and which can be driven from a motor 29 via chains 30, can then be slid through a number of worm hubs 27 and then act as a common drive unit or synchronous drive means for a plurality of transmission elements 10 which are arranged in a row. After assembly of the arrangement, the thermal expansion of the slats 7, and the inevitable inaccuracies which have varying degrees in the whole construction are compensated for by the springs 21. For carrying out coarse adjustment during assembly, which for example must take into account differing local bending of the supports 12 due to the spring forces, a further device is provided, whose construction is also shown in FIGS. 4 and 5.

The cylindrical sleeve 19 is provided on its periphery with two axially aligned grooves 31, which are displaced by 180°, and which the conjunction with two projections 32 on the bushing 15 provide a protection against rotation for the sleeve 19. The bore of the sleeve is furthermore so chosen that the tiltable pin 14 can be slid into it and anchored there. For this purpose, the tiltable pin 14 has two parallel grooves 33 on its periphery which are displaced by 180°, one of the walls of these having a series of notches 34. During assembly, the tiltable pin 14 is slid into the bushing 19 in such a way that the grooves 33 slide exactly over two projections 35 provided on the inner wall of the sleeve 19. If now the tiltable pin 14 is rotated in the sense of the arrow 36 (clockwise) through a definite relatively small angle, the two projections 35 engage, depending on the chosen position, into the corresponding notches 34 and hold the tiltable pin fast. In this way it is possible at the time of assembly to compensate for coarse inaccuracies, whilst longitudinal variations in operation are taken up by the elastic adjusting path of the springs 21.

The worm gearing 25/26 which has been described offers, in conjunction with the splined shaft 11 (FIG. 2), considerable advantages. As the splined shaft is free to slide in the hubs of the worms, thermal expansion of the splined shaft does not have any effect on the worm gearing. Expansion in the axial direction of the splined shaft, which as is known can reach high values, is in this way kept completely away from the slat adjusting organs thanks to this construction. Of great advantage are the high gear ratios which can only be obtained with worm gearing, and which can vary from 1:20 to 1:60, which also make possible an extremely subtle rotation, on which the self-torsion of the splined shaft has virtually no influence.

Instead of the splined contour shown at 28 (FIG. 5), another contour may in fact be used, but a shaft provided with a relatively high number of splines has proved to be satisfactory, as this allows a very precise adjustment of the shaft to the slat position during assembly. According to FIGS. 2 and 3, the drive motor 29 is above the rows of slats at the end of the greenhouse; it would also be possible to connect up the motor at round about the halfway point of the splined shaft 11, so that the drive shafts could be driven for lengths of up to 140 meters without any problem.

It would also of course be possible to provide a motor on each longitudinal side of a row of slat elements for the drive shaft which is provided there. In all cases synchronous drive of the contoured shafts is absolutely essential so as to maintain the slats in substantially the same respective planes as they are rotated by the opposing tilting means.

The relatively large tension forces produced by the spring 21 are transferred, as is particularly shown in FIG. 5, to the ball bearing 18, so that the slats despite their high degree of pre-stressing, can be adjusted with only a small expenditure of energy.

When compared to the conventional material shading, the arrangement described makes it possible to produce shading at very favorable cost, its most important parts being practically free of wear and resistant to weathering, or, as is the case with the slat elements, can be replaced at low cost. Compared to material shading, whose ageing can be strongly influenced by the effects of light and heat, the aluminum foil which is used in conjunction with the present invention is suitable for use over a practically unlimited period.

The whole transmission element 10 is preferably made, with the exception of the spring 21, of plastics material, and the worm wheel and the bush make up one single part.

The rows of slat elements may, as in the drawing, lie horizontally. An inclined, e.g., ridge-like arrangemet of two neighboring rows of slat elements is possible.

It will be clear, that the shown detachable connection of the tiltable pins 14 and the tiltable pin bush 19 is simply a preferable embodiment, and that it is also possible to provide a single longitudinal groove 33 provided with notches and corresponding to this a single stop projection 35.

Regulation of the described device can take place using conventional means.

We claim:

1. A device for controlling the incidence of heat and light radiation on a growing area within greenhouses and the like comprising a plurality of slats of a non-self-supporting material arranged in parallel but side-by-side spaced relationship as in a Venetian blind, opposing pairs of means for supporting opposite ends of said slats and for tilting said slats about their longitudinal axes to open or close the slats, and means for rotating the opposing tilting means in synchronism, said tilting means including clamping means for contacting the opposite ends of each slat so as to maintain said slat in a substantially planar configuration, and tension means associated with each pair of tilting means to maintain the slat in tension as it rotates during the synchronous rotation of said opposing tilting means.

2. A device according to claim 1, wherein the slats lie in a horizontal plane and wherein the slats form several adjacent row of slats.

3. A device according to claim 1, wherein the material of the slats is thin aluminum foil of a limited elasticity.

4. A device according to claim 1, wherein the synchronous drive means comprises rotatably driven control shafts for respective opposing tilting means for a given slat, and wherein said tilting means include a rotatable pin for each end of each slat, which pin is connected to a corresponding control shaft via a worm gear, the clamping means being connected to said rotatable pin.

5. A device according to claim 4, wherein the control shaft has a transmission contour on its periphery and co-operates with and is received within a corresponding inside contour of a bushing of the worm of the worm gear in which it is longitudinally slidable.

6. A device according to claim 4, wherein the rotatable pin is detachably coupled in an axial direction thereof with a cylindrical pin bushing, the pin bushing having a spring collar which projects radially outwardly thereof, a helical spring being arranged between the pin bushing and a cylindrical bushing which is attached to a housing, the spring holding the rotatable pin in an elastic state of tension and serving as the tension means, said pin being supported at one end by the spring collar of the pin bushing and at the other by an annular flange of the cylindrical bushing.

7. A device according to claim 6, wherein the worm wheel of the worm gearing is arranged at the periphery of the cylindrical bushing and is made in one part with the latter as a plastics piece and wherein a ring-like end surface of the worm wheel has a guiding groove for a ball bearing, which permits a friction-free rotation of the rotatable pin which is maintained under a pre-stressing force.

8. A device according to claim 6, wherein the rotatable pin can be slid into the bore of the pin bushing and has on its outer surface two parallel axially extending longitudinal grooves which are displaced from one another by 180°, one limiting wall of each of which is provided with notches, and wherein the pin bushing has on its inner surface two stop projections which are also displaced from one another by 180° and which can be inserted into any desired pair of said notches by an axial movement thereof along the longitudinal grooves followed by partial rotation.

* * * * *